United States Patent [19]

Scales, III et al.

[11] Patent Number: 4,799,199
[45] Date of Patent: Jan. 17, 1989

[54] BUS MASTER HAVING BURST TRANSFER MODE

[75] Inventors: Hunter L. Scales, III, Austin; William C. Moyer, Dripping Springs, both of Tex.; William D. Wilson, Redwood City, Calif.

[73] Assignee: Motorola, Inc., Schaumburg, Ill.

[21] Appl. No.: 908,766

[22] Filed: Sep. 18, 1986

[51] Int. Cl.⁴ .................... G11C 8/00; G11C 11/40
[52] U.S. Cl. ..................... 365/230; 365/235; 365/238
[58] Field of Search .......... 365/230, 235, 238; 364/200, 900

[56] References Cited

U.S. PATENT DOCUMENTS 4,236,203 11/1980 Curley et al. ............... 364/200
4,370,712 1/1983 Johnson et al. ............. 364/200
4,633,441 12/1986 Ishimoto ................. 365/230 X

OTHER PUBLICATIONS

The Handbook of Microcomputer Interfacing by Steve Leibson Tab Book Inc., Pa. 1983 pps. 90-105; 127-133.

Primary Examiner—Stuart N. Hecker
Assistant Examiner—Alyssa H. Bowler
Attorney, Agent, or Firm—Jeffrey Van Myers

[57] ABSTRACT

A data processing system having a bus master and a memory which is capable of transferring operands in bursts of m in response to a burst request signal provided by the bus master, the operands being clustered modulo m about a selected access address provided by the bus master, where m is two (2) to the n power, n being an integer and characteristic of the memory. The bus master is adapted to automatically increment, modulo m, a selected set n of the bits of the access address as each operand in the burst is transferred, provided that the memory has indicated that the burst can be continued and less than m operands have been transferred.

8 Claims, 2 Drawing Sheets

WHERE:
BRST = BURST START
BREQ = BURST REQUEST
BACK = BURST ACKNOWLEDGE
TERM = TERMINATE CYCLE

BUS MASTER HAVING BURST TRANSFER MODE

FIELD OF THE INVENTION

The subject invention relates generally to bus masters and, more particularly, to a bus master having a burst transfer mode of operation.

BACKGROUND ART

In most integrated circuit memory devices, each storage cell is individually accessed using a unique access address. However, in some integrated circuit memory devices, several other storage cells are accessed simultaneously and the contents thereof are held temporarily in a buffer. Typically, the access addresses of these "extra" storage cells differ from the original access address by only one or two bits. However, subsequent accesses to these cells can be accomplished by simply executing additional access cycles without changing the access address. In the art, such memories are referred to as "nibble mode". In some other integrated circuit memories, a portion of the original access address can be "assumed" for one (or more) subsequent accesses, so that only the least significant portion of the address needs to be decoded, etc. Thus, once the original access has been completed, subsequent accesses to "related" storage cells will be significantly quicker. These types of memories are sometimes referred to as "column mode" or "static column". In memory systems constructed using such enhanced performance memory devices, the effect is to allow the memory to sustain rapid transfers of several operands in "bursts" of m, where m is two (2) to the n power, n being an integer and characteristic of the selected memory device.

SUMMARY OF THE INVENTION

Accordingly, it is an object of the present invention to provide a bus master having a burst mode which takes advantage of the burst capability of a memory.

These and other objects are achieved in a bus master for use with a memory capable of transferring operands in bursts of m in response to a burst request signal provided by the bus master., the operands being clustered modulo m about a selected access address provided by the bus master, where m is two (2) to the n power, n being an integer, the bus master comprising: a special address register means which selectively stores the selected access address, but which increments modulo m a predetermined set of n bits of said selected access address in response to an increment signal; and a burst controller which initially provides the burst request signal to the memory in response to a burst start signal, and, for m−1 times thereafter, provides the burst request signal to the memory and the increment signal to the address register means in response to concurrently receiving from the memory both a burst acknowledge signal and a termination signal.

DESCRIPTION OF THE INVENTION

Figure 1:
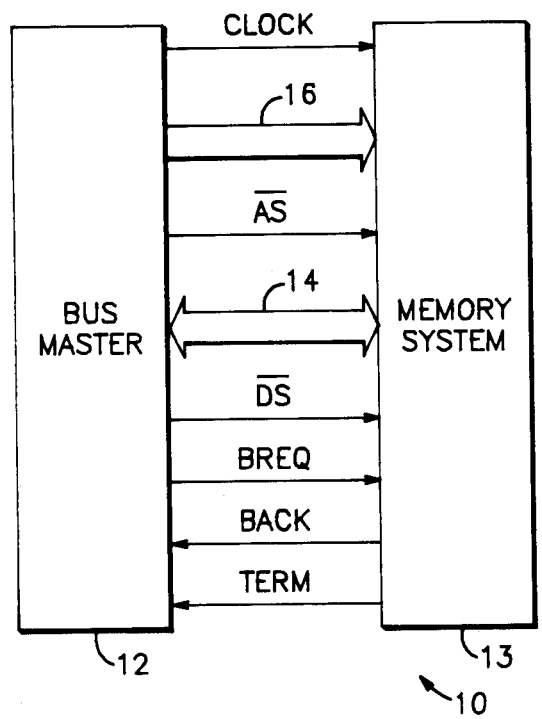
FIG. 1 illustrates in block diagram form, a data processing system having a bus master constructed in accordance with the present invention.
Figure 2:
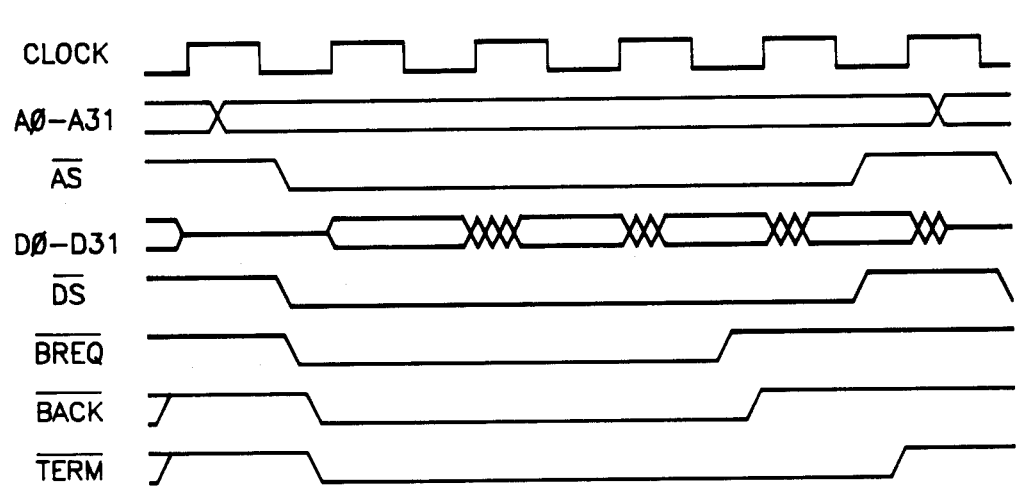
FIG. 2 illustrates in timing diagram form, the operation of the data processing system shown in FIG. 1.

Shown in FIG. 1 is a data processing system 10 comprising a bus master 12 and a memory system 13 which is capable of transferring operands via a data bus 14 in bursts of m in response to a burst request (BREQ) signal provided by the bus master 12, the operands being clustered modulo m about a selected access address provided by the bus master 12 via an address bus 16, where m is two (2) to the n power, n being an integer and characteristic of the memory 13. A timing diagram illustrating the timing and protocol for such a burst transfer is shown in FIG. 2.

Figure 3:
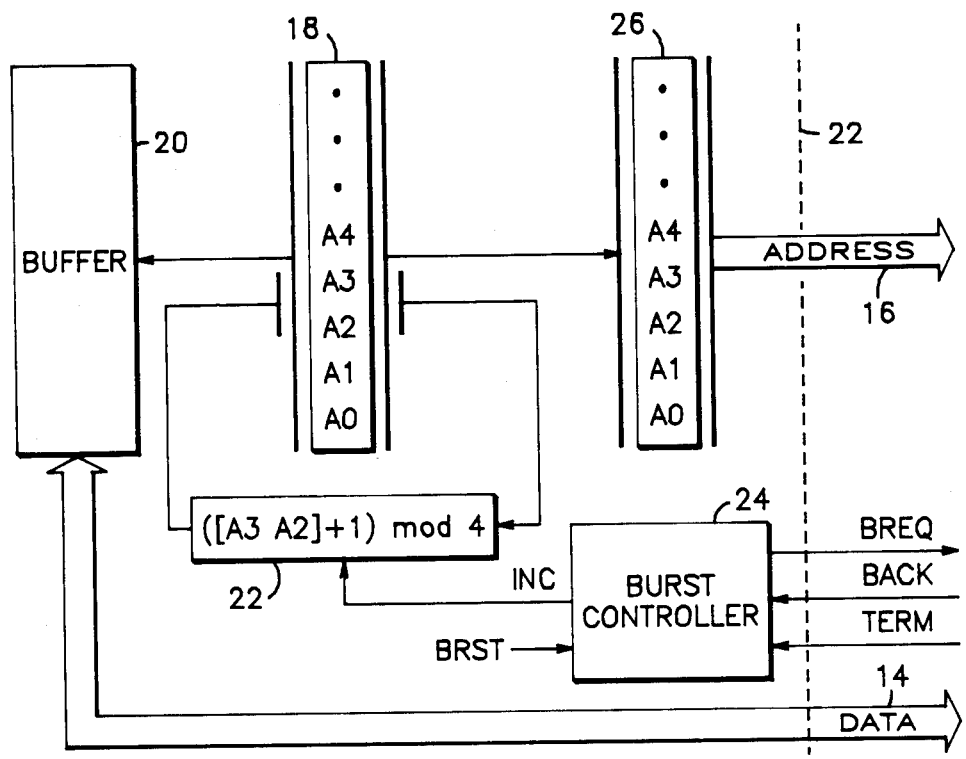
FIG. 3 illustrates in block diagram form, the preferred form of the bus master shown in FIG. 1.

In the preferred embodiment of the bus master 12 shown in FIG. 3, an address register 18 stores the access address for each operand which is to be transferred between the memory 13 and a buffer 20. A modulo-m adder 22 is provided to increment, modulo m, an appropriate set n of the bits of the access address stored in the address register 18, in response to an increment (INC) signal provided by a burst controller 24.

In response to a burst start (BRST) signal provided by other circuitry (not shown) in the bus master 12, the burst controller 24 will initially provide the BREQ signal to indicate to the memory 13 that the bus master 12 wishes for the memory 13 to continue after the current access cycle with the next operand in the burst. If at the end of the current access cycle the memory 13 decides that it can "burst" the next operand, it will so indicate by providing, substantially simultaneously, both a burst acknowledge (BACK) signal and a cycle termination (TERM) signal; otherwise, it simply provides the TERM signal.

Figure 4:
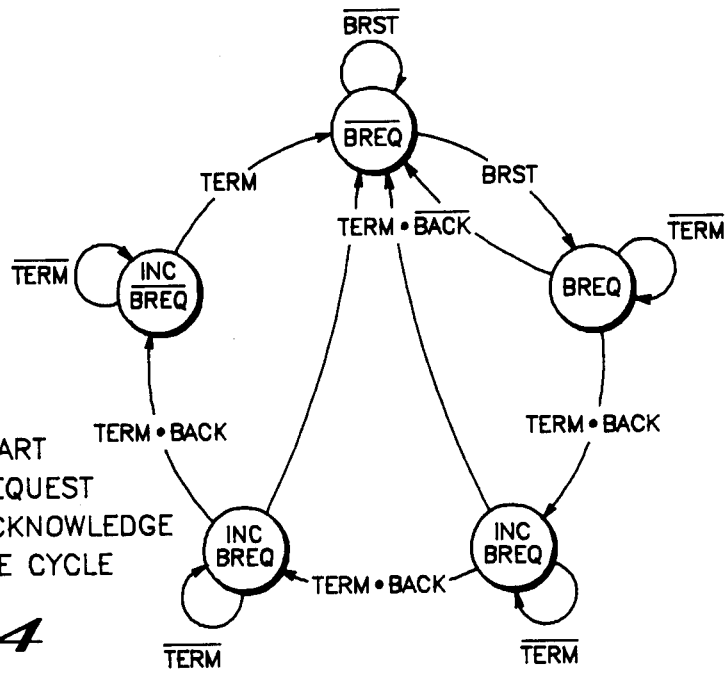
FIG. 4 illustrates in state diagram form, the operation of the burst controller of the bus master shown in FIG. 3.

In response to receiving both the BACK and the TERM signals, the burst controller 24 will again provide the BREQ signal to the memory 13. In addition, the burst controller 24 will provide, substantially simultaneously, the INC signal to the adder 22 to "sequence" the access address stored in the address register 18. In response to receiving just the TERM signal or after m−1 operands have been burst transferred, the burst controller 24 will cease to provide either the BREQ or the INC signals. FIG. 4 illustrates in state diagram form the operation of the burst controller 24.

Although the present invention has been described herein in the context of a preferred embodiment, alternate embodiments may be made without departing from the spirit and scope of the present invention. For example, in some applications it may be appropriate to provide an address latch 26 to buffer the access address provided by the address register 18 to the memory 13 via the address bus 16. In fact, in some systems, the memory 13 may have no need for the sequenced access address after the first operand in the burst has been transferred. Of course, the values m and n may vary between particular applications. In addition, however, the set n of the bits of the access address which are incremented by the adder 22 may be varied to correspond to the operand size supported by the burst mode of the memory 13, particularly if the memory 13 supports individual operand transfers of smaller size. Further, it is possible to conceive of a memory 14 which uses different "handshaking"; e.g., which does not provide burst acknowledge and/or termination signals, but simply responds to a burst request with the requested operands.

What is claimed is:

1. A bus master for use with a memory capable of transferring operands in bursts of m in response to a burst request signal provided by the bus master, the operands being clustered modulo m about a selected access address provided by the bus master, where m is two (2) to the n power, n being an integer, the bus master comprising:

address register means for selectively storing the selected access address, and for incrementing modulo m a predetermined set of n bits of the selected access address in response to an increment signal; and controller means for initially providing the burst request signal to the memory in response to a burst start signal, and, for m times thereafter, providing the burst request signal to the memory and the increment signal to the address register means in response to concurrently receiving from the memory both a burst acknowledge signal and a termination signal.

2. The bus master of claim 1 wherein the controller means will provide neither the burst request signal nor the increment signal in response to receiving only the termination signal.

3. The bus master of claim 2 wherein n is Two (2) and m is Four (4).

4. The bus master of claim 2 wherein the set of n bits of the access address are selected to correspond to the size of the operands.

5. The bus master of claim 4 wherein n is Two (2) and m is Four (4).

6. The bus master of claim 1 wherein the set of n bits of the access address are selected to correspond to the size of the operands.

7. The bus master of claim 6 wherein n is Two (2) and m is Four (4).

8. The bus master of claim 1 wherein n is Two (2) and m is Four (4).

* * * * *

UNITED STATES PATENT AND TRADEMARK OFFICE
CERTIFICATE OF CORRECTION

PATENT NO. : 4,799,199
DATED : January 17, 1989
INVENTOR(S) : Hunter L. Scales, III; William C. Moyer; William D. Wilson It is certified that error appears in the above-indentified patent and that said Letters Patent is hereby corrected as shown below:

In claim 1, Col. 3, line 18, change "m" to --(m-1)--.

Signed and Sealed this

Twenty-fifth Day of July, 1995

Attest:

BRUCE LEHMAN

*Attesting Officer*            *Commissioner of Patents and Trademarks*